B. C. McCLURE.
ROD PACKING.
APPLICATION FILED APR. 5, 1917.

1,321,930.  
Patented Nov. 18, 1919.

Inventor  
Benjamin C. McClure,  
By his Attorney

UNITED STATES PATENT OFFICE.

BENJAMIN CARL McCLURE, OF FOREST HILLS GARDENS, NEW YORK, ASSIGNOR TO H. W. JOHNS-MANVILLE COMPANY, A CORPORATION OF NEW YORK.

ROD-PACKING.

1,321,930.     Specification of Letters Patent.     Patented Nov. 18, 1919.

Application filed April 5, 1917. Serial No. 159,995.

*To all whom it may concern:*

Be it known that I, BENJAMIN C. MCCLURE, a citizen of the United States of America, residing at Forest Hills Gardens, county of Queens, State of New York, have invented certain new and useful Improvements in Rod-Packings, of which the following is a specification.

My invention relates to rod packing for use in stuffing boxes around piston rods, valve rods and the like, and consists of an improved combination of woven fabric and elastic material such as rubber producing a structure of great durability and elasticity under compression. The best form of my invention at present known to me is illustrated in the accompanying sheet of drawings in which—

Figure 1:
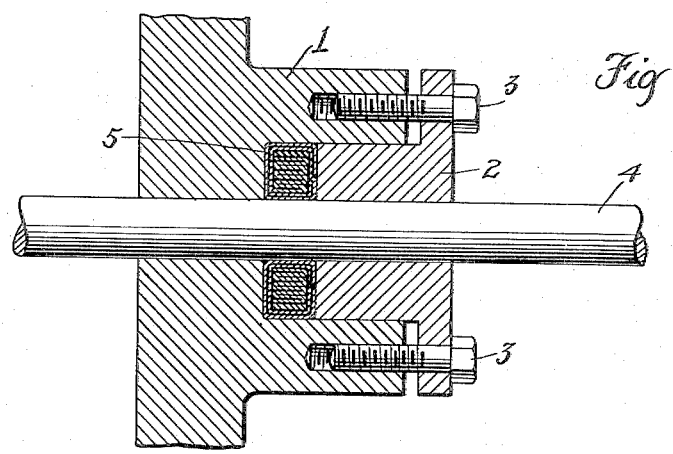
Figure 1 is an axial section of a stuffing box with my improved packing therein, parts being broken away.
Figure 2:
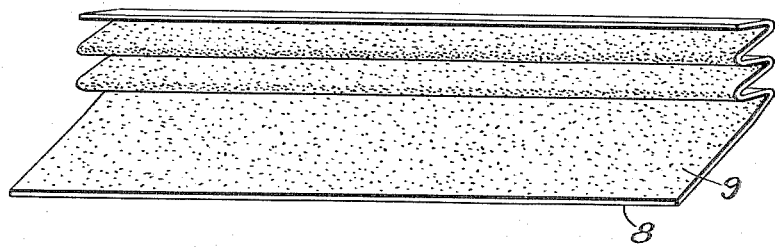
Fig. 2 is a perspective view of a piece of fabric partly folded for use in the core of the packing.

Throughout the drawings like reference characters indicate like parts. 1, is the stuffing box proper, 2, the gland held in place by bolts 3, 3, and 4, the piston rod. The packing 5, is composed, as usual, of a core and a wrapping. The wrapping 6, is made of a sheet of closely woven fabric such as asbestos cloth with a layer of suitable adhesive material, 7, such as rubber cement, which serves to hold its various layers together firmly and to cause it to adhere to the exterior surfaces of the core.

The main feature of novelty in my packing is the block or body of the core which is formed of a sheet of closely woven textile fabric 8, preferably containing a large percentage of asbestos, which has a layer or film 9, of adhesive material, such as rubber cement, on one side only. The sheet 8, with the freshly applied cement 9, is folded back and forth upon itself several times to form the block of the core, as shown in the drawings. Preferably the core has a backing of some yielding elastic material such as the strip of rubber 10.

Figure 3:
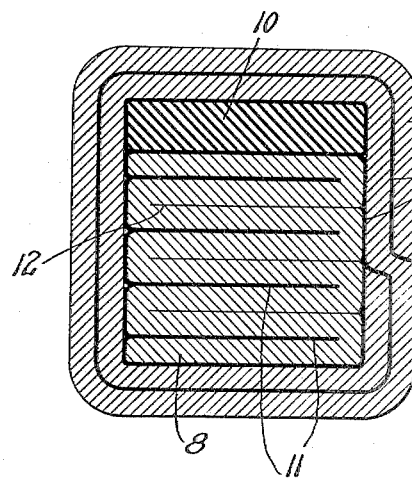
Fig. 3 is a cross section of the packing shown on a larger scale.

In use the packing is coiled about the rod 4, with the elastic backing 10, farthest from the rod, and all the layers of the core parallel to the rod surface. The improved mode of operation and results of my invention are due to the fact that as the cement is on one side only of the folded fabric 8, only every other pair of adjacent surfaces in the folds adhere together, as indicated at 11, 11, in Fig. 3. The other pairs of adjacent surfaces 12, 12, are not cemented together and are free to bulge away from one another or slide one over the other when the packing is compressed by the gland 2. It follows from this that while the core is permitted by this bulging action to expand radially toward the rod under gland pressure and so form a steam tight contact therewith at all times, its integrity is always maintained because even after the portion of the wrapping 6, forced against the piston, is worn away, the folds of the core block will still be held in position and another surface of the same closely woven fabric will come into use as a bearing surface, *i. e.* the first fold of the core block sheet 8, and then the second, and so on progressively.

The packing being formed throughout of closely woven fabric is much more dense and durable than as though formed of loosely braided tubing, and is in every way superior to packing in which the core block is formed of one or more tubes.

As only one side of the fabric 8, is covered with cement, the fabric can be easily impregnated with any desired material designed to keep it soft, or resilient or otherwise preserve it.

Having described my invention, I claim:

A rod packing having in combination a wrapping of fabric and a core comprising a single sheet of woven fabric provided on one side only with a layer of cementitious material, said fabric being folded back and forth on itself several times to form the core block, whereby the cement covered surfaces adhere together sufficiently to hold the form of the core block during the process of manufacture, but the non cemented surfaces are free to separate and permit the block to expand at right angles to said surfaces when compressed in use in a direction parallel to said surfaces.

BENJAMIN CARL McCLURE.